US011435309B2

(12) United States Patent
Khosravani

(10) Patent No.: US 11,435,309 B2
(45) Date of Patent: Sep. 6, 2022

(54) METHOD AND APPARATUS FOR DETECTING PLY INCONSISTENCIES WITHIN COMPOSITE OBJECTS

(71) Applicant: The Boeing Company, Chicago, IL (US)

(72) Inventor: Shahriar Khosravani, Everett, WA (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 16/721,767

(22) Filed: Dec. 19, 2019

(65) Prior Publication Data

US 2021/0190714 A1 Jun. 24, 2021

(51) Int. Cl.
*G01N 27/20* (2006.01)
*G01N 27/04* (2006.01)

(52) U.S. Cl.
CPC ........... *G01N 27/20* (2013.01); *G01N 27/041* (2013.01)

(58) Field of Classification Search
CPC ....... G01N 27/24; G01N 27/20; G01N 27/041
USPC ................ 324/693, 658, 660–663, 691, 71.1
See application file for complete search history.

(56) References Cited

U.S. PATENT DOCUMENTS

| | | | |
|---|---|---|---|
| 5,602,486 A | 2/1997 | Novak | |
| 6,002,131 A * | 12/1999 | Manalis | G01N 27/24 |
| | | | 324/458 |
| 6,369,588 B1 * | 4/2002 | Sleefe | G01B 7/287 |
| | | | 324/663 |

FOREIGN PATENT DOCUMENTS

CN 110514703 A 11/2019

OTHER PUBLICATIONS

Karhunen Kimmo et al., "Electrical resistance tomography for assessment of cracks in concrete," ACI Materials Journal, No. 107, Sep. 1, 2010, pp. 523-531, XP055799005, 37 pages.
Baltopoulos Athanasios et al., "Damage identification in carbon fiber reinforced polymer plates using electrical resistance tomography mapping," Journal of Composite Materials, vol. 47, No. 26, Dec. 1, 2013, pp. 3285-3301, XP 055798952, USA, ISSN 0021-9983, DOI 10.1177/0021998312464079, retrieved from the Internet, retrieved from hllps://journals.sagepub.com/doi/pdf/10.1177/0021998312464079, 18 pages.
Nonn Susanne et al., "Application of electrical impedance tomography to an anisotropic carbon fiber-reinforced polymer composite laminate for damage localization," Composites Science and Technology, vol. 106, Mar. 27, 2018, pp. 231-236, XP055798947, ISSN 0266-3538, DOI 10.106/j.compscitech.2018.03.31, 6 pages.

* cited by examiner

*Primary Examiner* — Jermele M Hollington
*Assistant Examiner* — Courtney G McDonnough
(74) *Attorney, Agent, or Firm* — Haynes and Boone, LLP

(57) ABSTRACT

A plurality of plate pairs that includes at least three plate pairs are positioned over a surface of the composite object. A resistance of a plurality of plies in the composite object is measured in at least three different fiber orientations. Each of the at least three different fiber orientations is measured via a corresponding one of the at least three plate pairs.

20 Claims, 12 Drawing Sheets

METHOD AND APPARATUS FOR DETECTING PLY INCONSISTENCIES WITHIN COMPOSITE OBJECTS

FIELD

This disclosure generally relates to testing composite objects and, more particularly, to methods and apparatuses for noninvasively testing plies in a composite object using pairs of capacitive plates.

BACKGROUND

Carbon fiber reinforced polymers (CFRP) are an example of one type of composite material. The carbon fibers in a carbon fiber reinforced polymer provide both mechanical strength and electrical conductivity. A composite part may be made of multiple plies of carbon fiber reinforced polymer. Non-destructive inspection (NDI) testing may be used to test the plies in such a composite part. But traditional, currently available non-destructive inspection testing techniques, such as those involving ultrasound propagation, may only reveal regions of ply delamination. These testing techniques may be unable to provide information about discontinuity of the carbon fibers within the plies. For example, these testing techniques may not be sufficiently sensitive to provide information about fiber electrical conductivity or fiber continuity within a composite object.

Carbon fiber continuity in a composite object is related to the mechanical tensile strength of the composite object. For example, broken or discontinuous carbon fibers may reduce the mechanical tensile strength of a composite object. Further, broken or discontinuous carbon fibers may reduce the ability of a composite object to conduct electrical current (e.g., lightning). Thus, it is important to have a way of detecting carbon fiber discontinuity in composite objects during composite manufacturing and repair stages. Therefore, it may be desirable to provide methods and apparatuses that take into account at least some of the issues described above.

SUMMARY

In one illustrative example, an apparatus comprises a plurality of plate pairs and a base to which the plurality of plate pairs is attached. The plurality of plate pairs includes at least three plate pairs, each plate pair comprising two capacitive plates aligned to measure a resistance of a plurality of plies in a different fiber orientation.

In another illustrative example, a method is provided for testing a composite object. A plurality of plate pairs that includes at least three plate pairs are positioned over a surface of the composite object. A resistance of a plurality of plies in the composite object is measured in at least three different fiber orientations. Each of the at least three different fiber orientations is measured via a corresponding one of the at least three plate pairs.

In yet another illustrative example, a testing device comprises a base and a plurality of pairs attached to the base. Each plate pair includes two capacitive plates aligned to measure a resistance of plies in a composite object for a different fiber orientation. An area between the plurality of plate pairs defines a target area. When the plurality of plate pairs is positioned over a surface of the composite object, voltage measurements generated at each of a plurality of different positions over the surface provide an indication of whether a fiber discontinuity is present in the composite object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

DETAILED DESCRIPTION

The example embodiments described below provide methods, apparatuses, and systems for easily and efficiently detecting certain types of ply inconsistencies. In particular, the example embodiments provide methods, apparatuses, and systems for detecting fiber discontinuity in composite objects comprised of carbon fiber reinforced polymers (CFRPs). Fiber resistance is measured using capacitive coupling and the application of an alternating current (AC). These measurements may be used to create a two-dimensional map or map set of regions of fiber discontinuity. This type of map or map set may be very helpful for composite manufacturing and repair.

In one or more examples, a composite object may have plies of fibers that run in various directions. In one or more examples, pairs of plates are capacitively coupled over the surface of a composite object, with each pair being used to measure the effective series resistance for a different fiber orientation. In particular, the voltage differential between a reference branch and each of at least three measurement branches is measured. Each of these measurement branches may include a pair of plates capacitively coupled with a composite object that corresponds to a particular fiber orientation. The voltage differentials provide an indication of the effective series resistance in each fiber orientation and may be used to identify areas of the composite object that potentially include a ply inconsistency (e.g., fiber discontinuity).

This type of system and method for noninvasively testing a composite object enables the easy, fast, and efficient identification of ply inconsistencies. In particular, systems and methods similar to those described above may help ensure that a composite object has the desired mechanical strength (e.g., mechanical tensile strength) and the desired electrical conductivity (e.g., the ability to conduct and thereby help dissipate lightning current).

Figure 1:
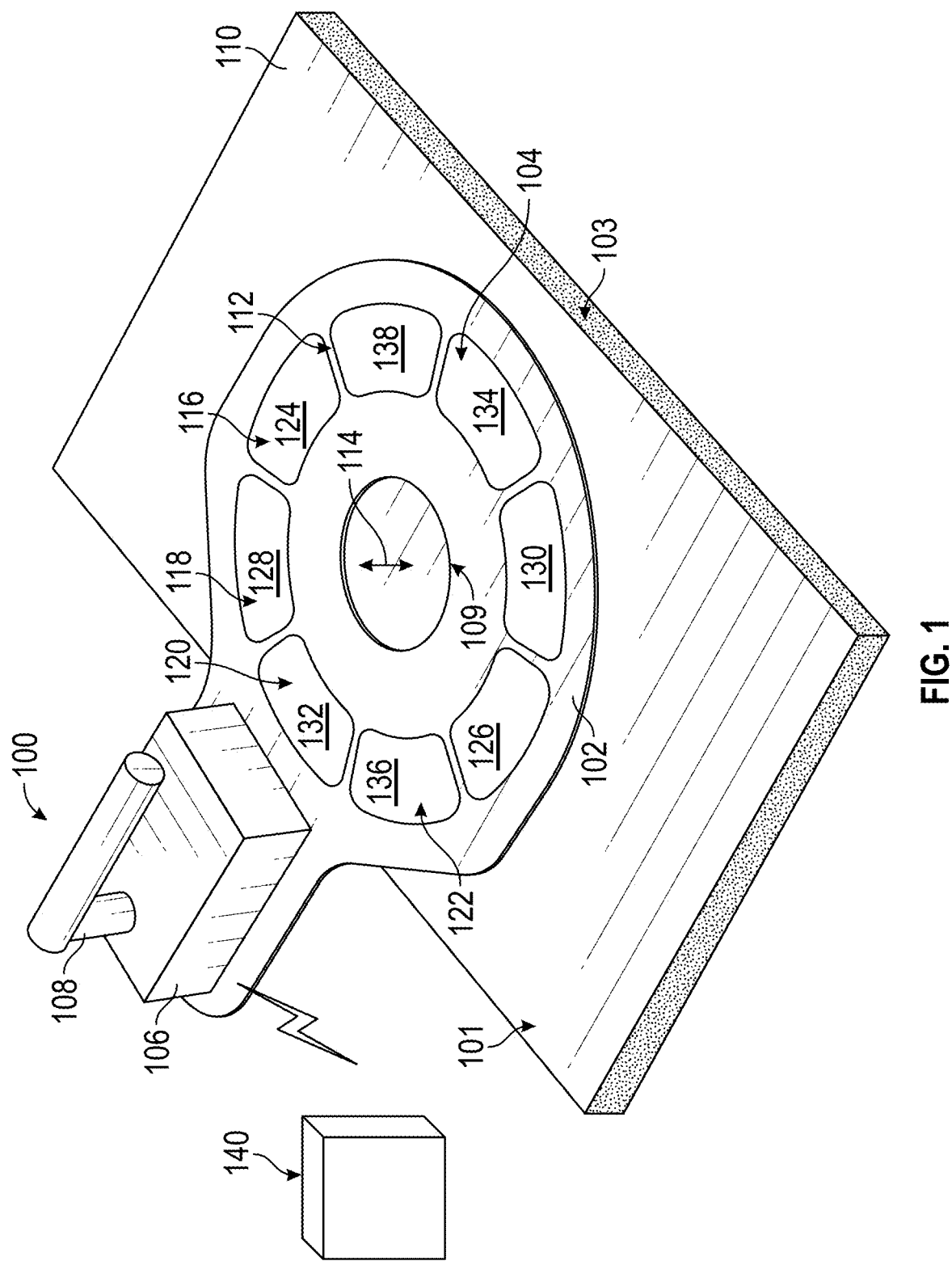
FIG. 1 is an illustration of a testing device in accordance with an example embodiment.

Referring now to the figures, FIG. 1 is an illustration of a testing device in accordance with an example embodiment. Testing device 100 may be used to test composite objects, such as composite object 101. In some cases, testing device 100 may be referred to as a testing system or a noninvasive testing device or system. Composite object 101 includes a plurality of plies 103 of composite material. In particular, plies 103 may be comprised of carbon fiber. For example, each ply of composite material may be a ply of carbon fiber reinforced polymer (CFRP).

Testing device 100 is used to detect areas of composite object 101 having undesired ply inconsistencies. An undesired ply inconsistency may be, for example, without limitation, fiber discontinuity or some other type of ply defect. In one or more illustrative examples, composite object 101 may be an aircraft composite structure. For example, composite object 101 may be a composite fuselage panel, a composite wing panel, or some other type of composite structure.

Testing device 100 includes base 102, plate system 104, control box 106, and handle 108. In this illustrative example, plate system 104 and control box 106 are both attached to base 102, with handle 108 being attached to control box 106. Base 102 has opening 109. In some cases, opening 109 corresponds to a target area. In one or more illustrative examples, base 102 is a printed circuit board having circuitry that is in communication with or otherwise connected to circuitry inside control box 106. For example, each of base 102 and control box 106 may include any number of electrical components such as inductors, capacitors, resistors, switches, other types of electrical components, or a combination thereof. In some examples, control box 106 may also be referred to as a housing.

Handle 108 may be used by an operator to move testing device 100 over a surface of an object, such as surface 110 of composite object 101. The operator may be a human operator or a robotic operator (e.g., a robotic arm or end effector).

In this illustrative example, plate system 104 includes a plurality of plate pairs 112. Plate pairs 112 may be aligned symmetrically with respect to center axis 114 through opening 109. For example, each of plate pairs 112 may include two plates aligned facing each other. In other words, each of plate pairs 112 may include two plates that are positioned on opposite sides of base 102. In this example, each of plate pairs 112 includes two plates positioned on opposite sides of opening 109. The plates of each of plate pairs 112 are capacitive plates and may be separated by a same distance.

Plate pairs 112 include at least three plate pairs. In this illustrative example, plate pairs 112 include four plate pairs. Specifically, plate pairs 112 include first plate pair 116, second plate pair 118, third plate pair 120, and fourth plate pair 122. In other examples, plate pairs 112 may include some other number of plate pairs such as, for example, three plate pairs or six plate pairs.

First plate pair 116 includes plate 124 and plate 126. Second plate pair 118 includes plate 128 and plate 130. Third plate pair 120 includes plate 132 and plate 134. Fourth plate pair 122 includes plate 136 and plate 138. Plates 124, 126, 128, 130, 132, 134, 136, and 138 may be capacitive plates. In these illustrative examples, each of plates 124, 126, 128, 130, 132, 134, 136, and 138 includes a metal layer and an insulating layer. In other illustrative examples, each plate may include only a metal layer.

As described above, plate pairs 112 are aligned symmetrically around opening 109. In this illustrative example, plate pairs 112 are arranged in a symmetrical octagonal configuration with respect to center axis 114. Testing device 100 may be positioned over composite object 101 such that the alignment of plate pairs 112 can be used to provide measurements of resistance in particular fiber orientations (i.e., fiber directions). More specifically, each of plate pairs 112 is aligned for use in measuring resistance in a different fiber orientation. This resistance may be an effective series resistance (ESR) for that fiber orientation.

As one illustrative example, first plate pair 116 is used to measure resistance in a 0-degree fiber orientation. Second plate pair 118 is used to measure resistance in a 45-degree fiber orientation. Third plate pair 120 is used to measure resistance in a 90-degree fiber orientation. Fourth plate pair 122 is used to measure resistance in a 45-degree fiber orientation.

In some illustrative examples, the measurements generated by testing device 100 may be processed by computer system 140. Testing device 100 communicates wirelessly with computer system 140 in these examples. In other examples, however, testing device 100 may communicate with computer system 140 via one or more wired communications links, wireless communications links, optical communications links, or a combination thereof.

Figure 2:
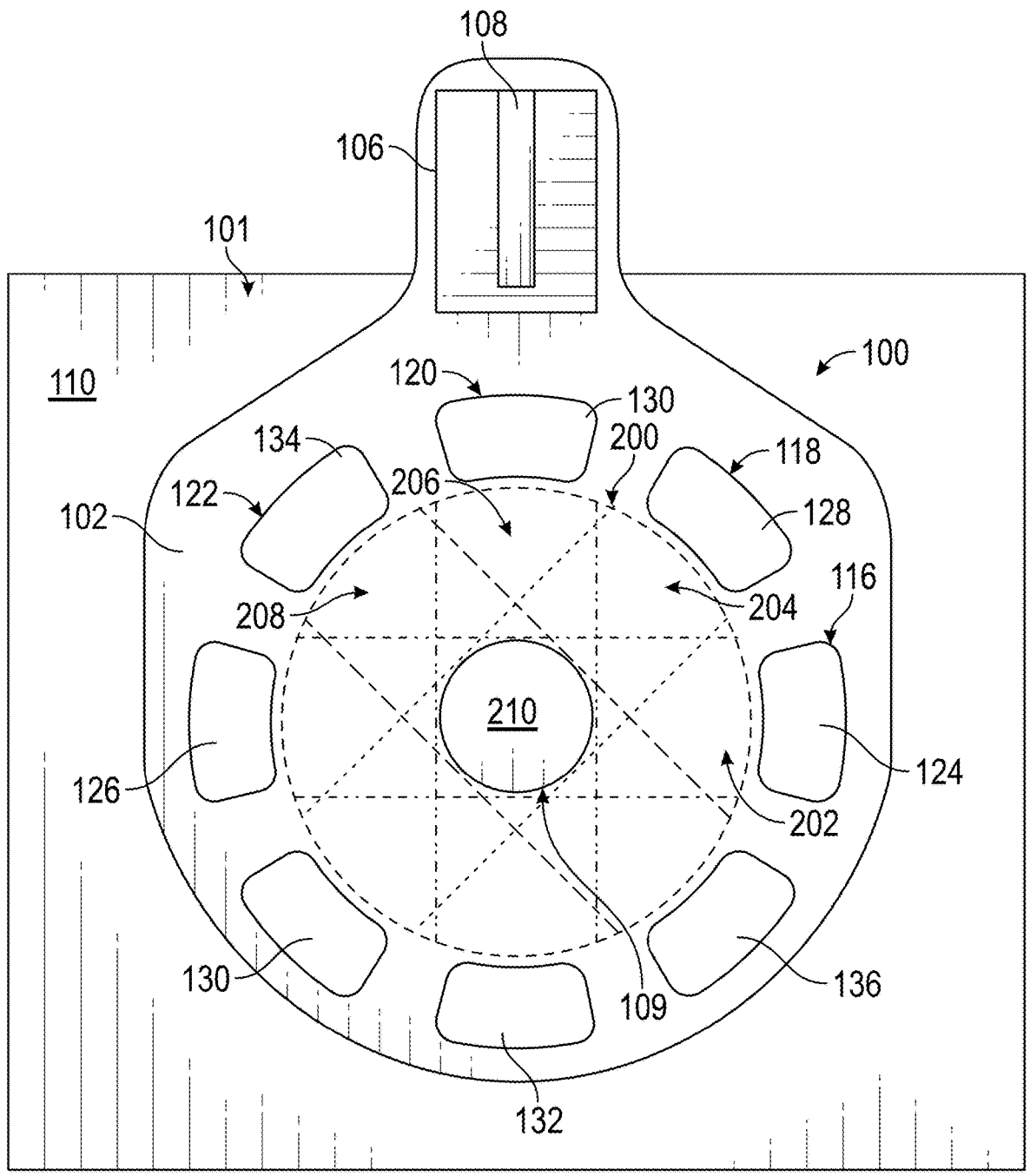
FIG. 2 is an illustration of a top view of plate pairs over a surface of a composite object from FIG. 1 in accordance with an example embodiment.

FIG. 2 is an illustration of a top view of testing device 100 over surface 110 of composite object 101 from FIG. 1 in accordance with an example embodiment. Area 200 between the plates of plate pairs 112 is the area in which measurements may be taken. When testing device 100 is placed over composite object 101, area 200 overlaps with a corresponding area or surface region of composite object 101. Area 140 includes first measurement area 202, second measurement area 204, third measurement area 206, and fourth measurement area 208.

First measurement area 202, second measurement area 204, third measurement area 206, and fourth measurement area 208 correspond to first plate pair 116, second plate pair 118, third plate pair 120, and fourth plate pair 122, respectively. More specifically, first measurement area 202 indicates the area over composite object 101 that will be most sensitive to fibers in the orientation corresponding to plate pair 116 (e.g., the 0-degree fiber orientation). Second measurement area 204 indicates the area over composite object 101 that will be most sensitive to fibers in the orientation corresponding to plate pair 118 (e.g., the 45-degree fiber orientation). Third measurement area 206 indicates the area over composite object 101 that will be most sensitive to fibers in the orientation corresponding to plate pair 120 (e.g., the 90-degree fiber orientation). Fourth measurement area 208 indicates the area over composite object 101 that will be most sensitive to fibers in the orientation corresponding to plate pair 122 (e.g., the −45-degree fiber orientation).

The area at which all four measurement areas (i.e., first measurement area 202, second measurement area 204, third measurement area 206, and fourth measurement area 208) overlap defines target area 210. Target area 210 is centrally located with respect to plurality of plate pairs 112. Target area 210 is the portion of area 200 that provides the best measurements for determining the resistance (e.g., effective series resistance) of a composite object, such as composite object 101, for all of the different fiber orientations. Target area 210 may also be referred to as a target testing area, a detection area, or a target detection area.

Figure 3:
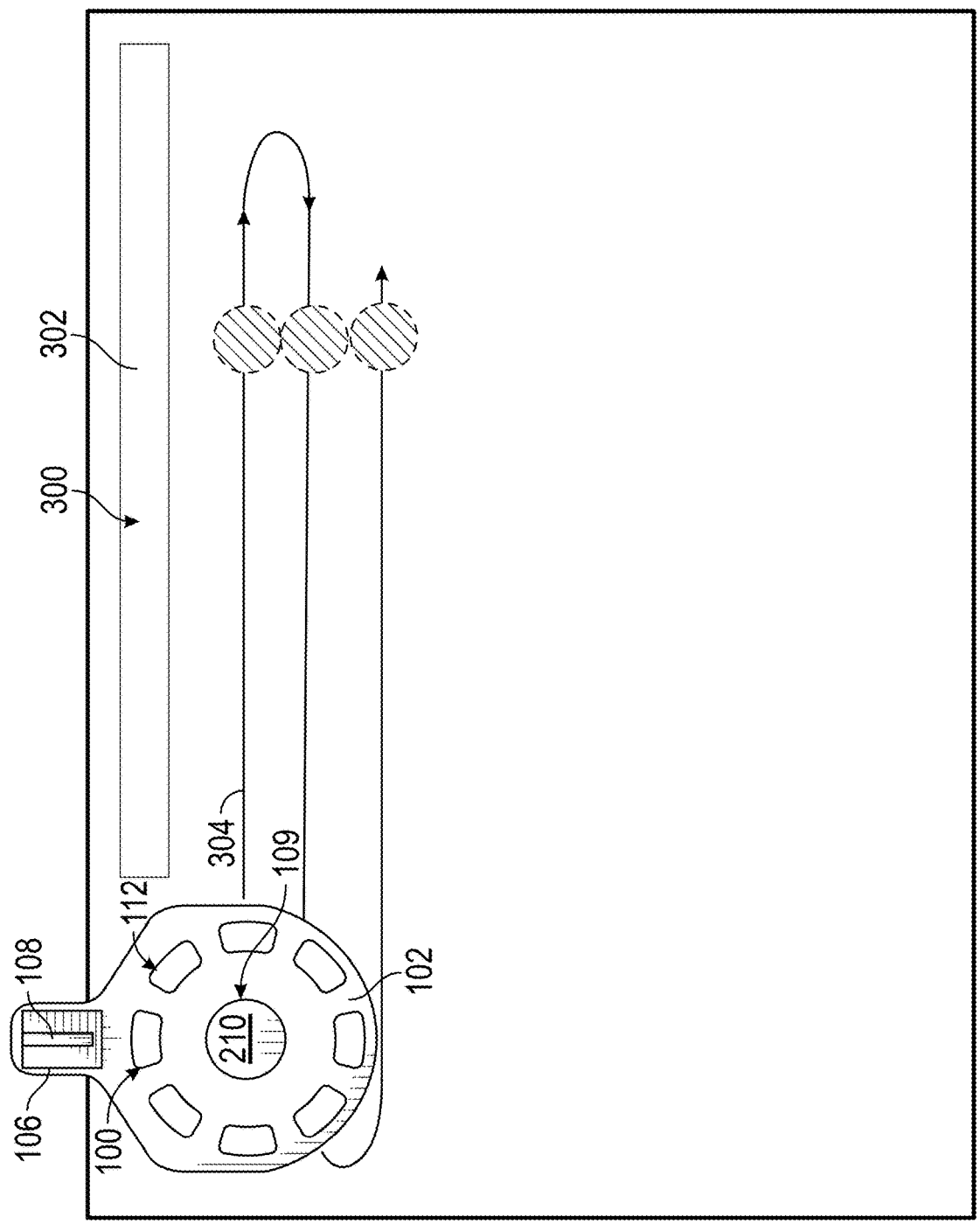
FIG. 3 is an illustration of a top view of a testing device positioned over a composite object in accordance with an example embodiment

FIG. 3 is an illustration of a top view of testing device 100 from FIG. 1 positioned over a composite object in accordance with an example embodiment. In FIG. 3, testing device 100 is used to test composite object 300. Similar to composite object 101 in FIG. 1, composite object 300 includes a plurality of plies, each ply being comprised of carbon fibers (e.g., CFRP).

These plies may include plies with fibers running in four different directions. For example, the plies may include one or more plies with fibers having a 0-degree fiber orientation, one or more plies with fibers having a 45-degree fiber orientation, one or more plies with fibers having a 90-degree fiber orientation, and one or more plies with fibers having a −45-degree fiber orientation.

In this example, testing device 100 is positioned over and contacts surface 302 of composite object 300. As previously discussed above, testing device 100 has target area 210 that provides the best measurements for determining the resistance of a composite object in all the different fiber orientations for composite object 300.

Testing device 100 may be moved over surface 302 of composite object 300 in any of a number of different patterns in order to test composite object 300. In this illustrative example, testing device 100 is moved in the direction of arrow 304 over surface 302 to follow a raster pattern. A raster pattern is a scan pattern in which an area is scanned from side to side in lines from top to bottom (these direction indications being relative). In these illustrative examples, the vertical "step" between these scan lines is set as the diameter of target area 210 to ensure that all portions of surface 302 are overlapped by target area 210 of testing device 100 at some point as testing device 100 is moved over surface 302.

Figure 4:
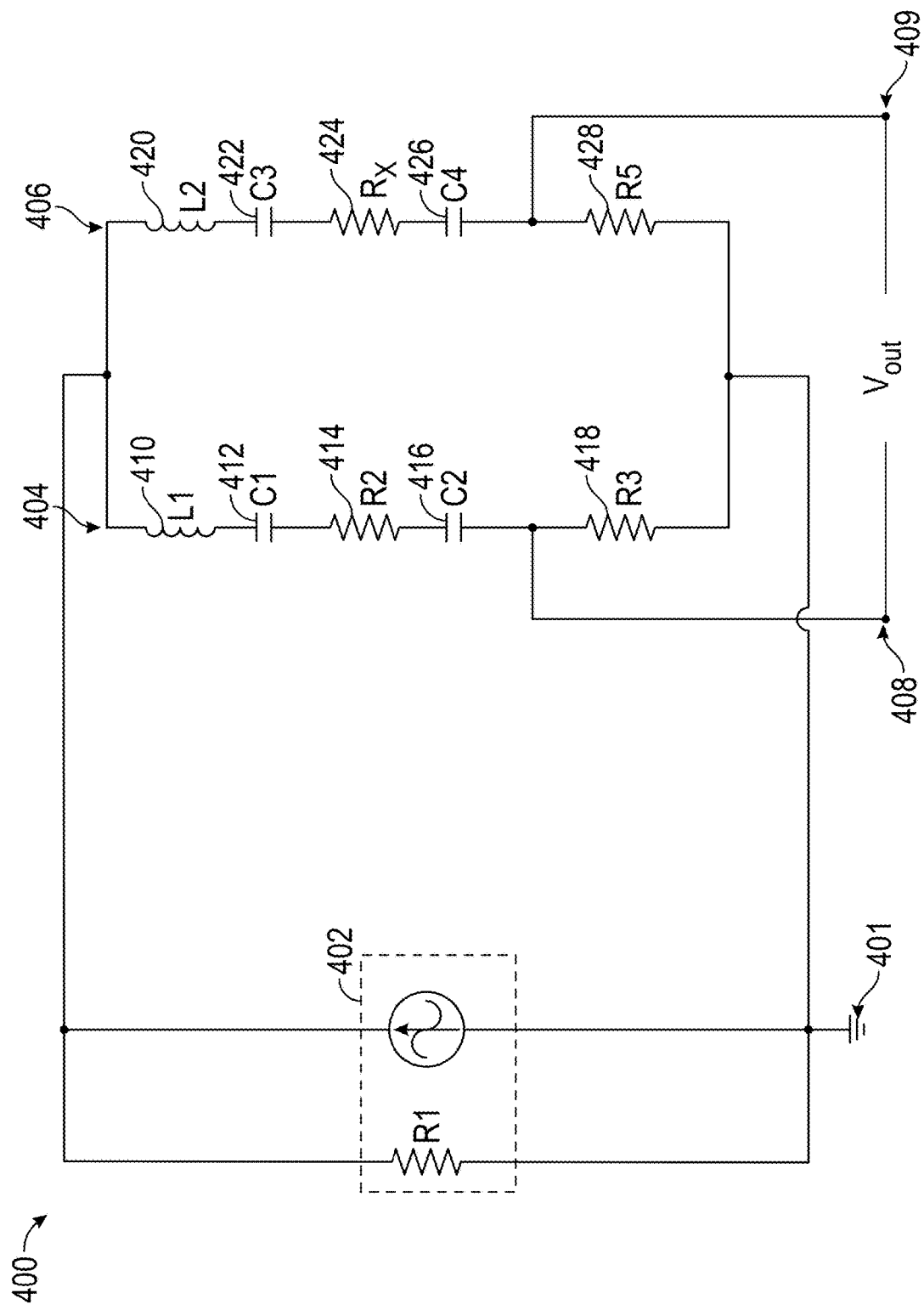
FIG. 4 is a circuit diagram in accordance with an example embodiment.

FIG. 4 is a circuit diagram in accordance with an example embodiment. Circuit 400 represents an example of a system that may be used to non-invasively test a composite object. Circuit 400 includes components that represent a combination of electronic components and physical components or structures.

In this illustrative example, circuit 400 includes ground 401 and alternating current (AC) voltage source 402 that has a frequency set to the resonance frequency, where:

$$f = \frac{1}{2\pi\sqrt{LC}}. \quad (1)$$

Circuit 400 also includes reference branch 404, branch 406 (which may be also referred to as a circuit branch or a measurement branch), voltage output 408, and voltage output 409. Reference branch 404 includes inductor 410, capacitor 412, resistor 414, capacitor 416, and resistor 418. Branch 406 includes inductor 420, capacitor 422, resistor 424, capacitor 426, and resistor 428.

In circuit 400, alternating current voltage source 402, inductor 410, capacitor 412, resistor 414, capacitor 416, resistor 418, inductor 420, and resistor 428 represent electronic components. Capacitor 422 and capacitor 426 represent physical capacitive components. For example, each of capacitor 422 and capacitor 426 may represent a capacitive plate. In particular, capacitor 422 and capacitor 426 represent capacitive plates that would be positioned and aligned over a composite object to measure the resistance, which may be the effective series resistance, of fibers in one orientation. Resistor 424 represents the effective series resistance of the physical fibers of the composite object being tested.

In this illustrative example, resistor 414, resistor 418, and resistor 428 are set to a resistance value based on an expected effective series resistance for the composite object. The value for the expected effective series resistance is based on the number of plies in the composite object, the thickness of each of the plies, and the ply density. In these illustrative examples, the ply density refers to the percentage of plies in each of the different fiber orientations for plies. For example, the ply density may indicate what percentage of plies have fibers in a first orientation, what percentage of plies have fibers in a second orientation, what percentage of plies have fibers in a third orientation, etc. The difference between voltage output 408 and voltage output 409 (i.e., the voltage differential) provides an indication of the difference between the effective series resistance for the composite object and the expected effective series resistance. A voltage difference outside of selected tolerances may be an indication of a fiber discontinuity.

Thus, circuit 400 represents a building block for testing a composite object with fibers running in a single direction. This building block may be built upon to allow for testing a composite object with fibers running in different directions. For example, multiple branches such as branch 406 may be daisy-chained together via a daisy-chain switching system to enable measurements for different fiber directions or orientations.

Figure 5:
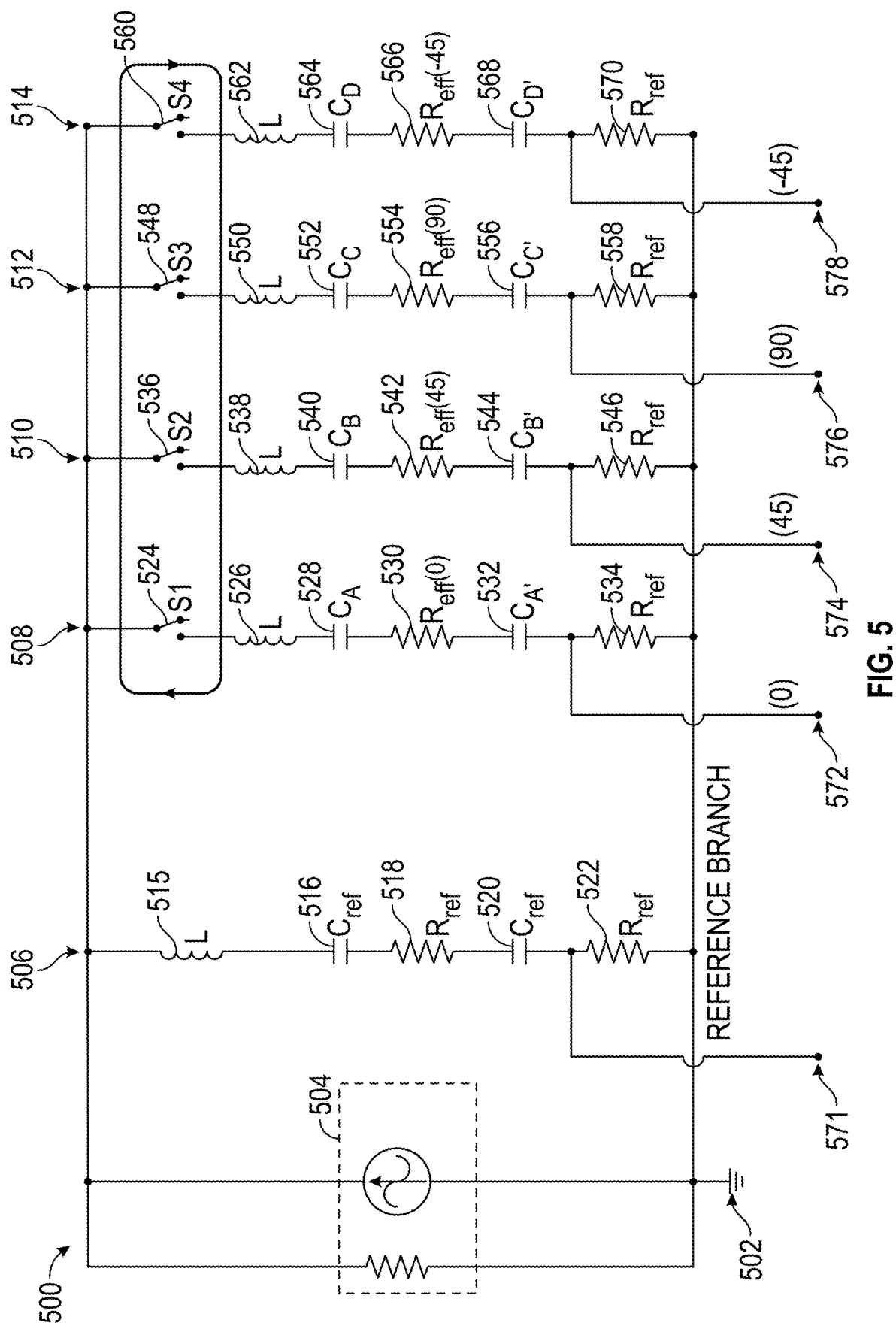
FIG. 5 is a circuit diagram in accordance with an example embodiment.

FIG. 5 is a circuit diagram illustrating the circuitry included in testing device 100 from FIGS. 1-3 in accordance with an example embodiment. In this illustrative example, circuit 500 represents the electronic components and physical structures of testing device 100 that enable testing a composite object, such as composite object 101 in FIGS. 1-3. Circuit 500 includes ground 502, alternating current voltage source 504, reference branch 506, first branch 508, second branch 510, third branch 512, and fourth branch 514. First branch 508, second branch 510, third branch 512, and fourth branch 514 may also be referred to as measurement branches.

Reference branch 506 includes inductor 515, capacitor 516, resistor 518, capacitor 520, and resistor 522. The components of reference branch represent electronic components that may be, for example, present in control box 106 in FIG. 1. Resistor 518 and resistor 522 are set to the expected effective series resistance for composite object 101, within selected tolerances, based on the number of plies 103 in composite object 101, the thickness of each of plies 103, and the ply density for plies 103.

First branch 508, second branch 510, third branch 512, and fourth branch 514 represent the portions of the circuitry in testing device 100 involved in taking measurements using first plate pair 116, second plate pair 118, third plate pair 120, and fourth plate pair 122, respectively. First branch 508 includes switch 524, inductor 526, capacitor 528, resistor 530, capacitor 532, and resistor 534. Second branch 510 includes switch 536, inductor 538, capacitor 540, resistor 542, capacitor 544, and resistor 546. Third branch 512 includes switch 548, inductor 550, capacitor 552, resistor 554, capacitor 556, and resistor 558. Fourth branch 514 includes switch 560, inductor 562, capacitor 564, resistor 566, capacitor 568, and resistor 570.

Capacitor 528 and capacitor 532 represent first plate pair 116 from FIG. 1. Resistor 530 represents the effective series resistance along the fiber direction (i.e., 0-degree fiber orientation) corresponding to first plate pair 116. Resistor 534 represents a reference resistance that is expected for the fiber direction (i.e., 0-degree fiber orientation) corresponding to first plate pair 116. In these examples, this reference resistance (e.g., expected effective series resistance) is set to the same value as resistor 518 and resistor 522, within selected tolerances.

Capacitor 540 and capacitor 544 represent second plate pair 118 from FIG. 1. Resistor 542 represents the effective series resistance along the fiber direction (i.e., 45-degree fiber orientation) corresponding to second plate pair 118. Resistor 546 represents a reference resistance that is expected for the fiber direction (i.e., 45-degree fiber orientation) corresponding to second plate pair 118. In these examples, this reference resistance (e.g., expected effective series resistance) is set to the same value as resistor 518 and resistor 522, within selected tolerances.

Capacitor 552 and capacitor 556 represent third plate pair 120 from FIG. 1. Resistor 554 represents the effective series resistance along the fiber direction (i.e., 90-degree fiber orientation) corresponding to third plate pair 120. Resistor 558 represents a reference resistance that is expected for the fiber direction (i.e., 90-degree fiber orientation) corresponding to third plate pair 120. In these examples, this reference resistance (e.g., expected effective series resistance) is set to the same value as resistor 518 and resistor 522, within selected tolerances.

Capacitor 564 and capacitor 568 represent fourth plate pair 122 from FIG. 1. Resistor 566 represents the effective series resistance along the fiber direction (i.e., −45-degree fiber orientation) corresponding to fourth plate pair 122. Resistor 570 represents a reference resistance that is expected for the fiber direction (i.e., −45-degree fiber orientation) corresponding to fourth plate pair 122. In these examples, this reference resistance (e.g., expected effective series resistance) is set to the same value as resistor 518 and resistor 522, within selected tolerances.

Circuit 500 includes voltage output 571 for reference branch 506, voltage output 572 for first branch 508, voltage output 574 for second branch 510, voltage output 576 for third branch 512, and voltage output 578 for fourth branch 514. Switches 524, 536, 548, and 560 form a daisy-chain network that enable the voltage differentials between reference branch 506 and the various measurement branches to be measured.

For example, the difference between voltage output 572 and voltage output 571 is used to indicate whether there is a difference between the effective series resistance for the fibers in the 0-degree fiber orientation and the expected effective series resistance for that fiber orientation. The difference between voltage output 574 and voltage output 571 is used to indicate whether there is a difference between the effective series resistance for the fibers in the 45-degree fiber orientation and the expected effective series resistance for that fiber orientation. The difference between voltage output 576 and voltage output 571 is used to indicate whether there is a difference between the effective series resistance for the fibers in the 90-degree fiber orientation and the expected effective series resistance for that fiber orientation. The difference between voltage output 578 and voltage output 571 is used to indicate whether there is a difference between the effective series resistance for the fibers in the −45-degree fiber orientation and the expected effective series resistance for that fiber orientation. These measurements may be generated at a plurality of positions over a composite object to fully test the composite object.

In some illustrative examples, voltage output 572, voltage output 574, voltage output 576, and voltage output 578 may be used to determine a ply density of a composite object. For example, a composite object may have four fiber orientations with a ply density as follows: 40 percent of plies in the 0-degree orientation, 20 percent of plies in the 45-degree orientation, 20 percent of plies in the −45-degree orientation, and 20 percent of plies in the 90-degree orientation. When the reference resistors (resistor 534, resistor 546, resistor 558, and resistor 570 and optionally, resistor 518 and resistor 522) are set to zero, the ratio of the of voltage output 572, voltage output 574, voltage output 576, and voltage output 578 relative to each other may provide an indication of the ply density of the composite object.

Figure 6:
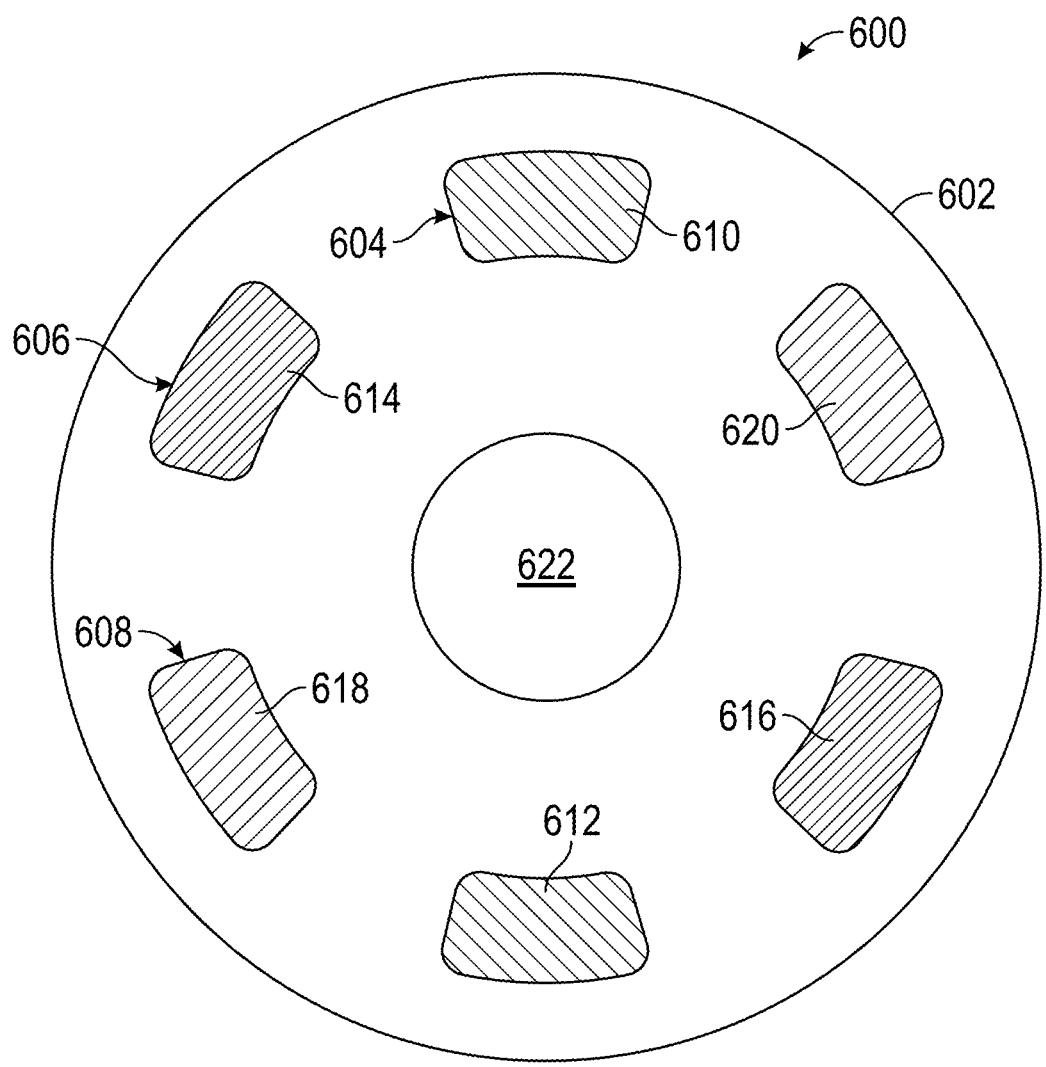
FIG. 6 is an illustration of a top view of a testing device in accordance with an example embodiment.

FIG. 6 is an illustration of another testing device in accordance with an example embodiment. Testing device 600 includes base 602 and first plate pair 604, second plate pair 606, and third plate pair 608. Although not shown in this example, testing device 600 may also include a control box similar to control box 106 in FIG. 1, a handle similar to handle 108 in FIG. 1, or both.

First plate pair 604 includes plate 610 and plate 612. Second plate pair 606 includes plate 614 and plate 616. Third plate pair 608 includes plate 618 and plate 620. First plate pair 604, second plate pair 606, and third plate pair 608 are aligned symmetrically around target area 622. In particular, these three plate pairs have a symmetrical hexagonal configuration. First plate pair 604 may be used to measure resistance (e.g., effective series resistance) in a 0-degree fiber orientation. Second plate pair 606 may be used to measure resistance in a 60-degree fiber orientation. Third plate pair 608 may be used to measure resistance in a −60-degree fiber orientation.

Figure 7:
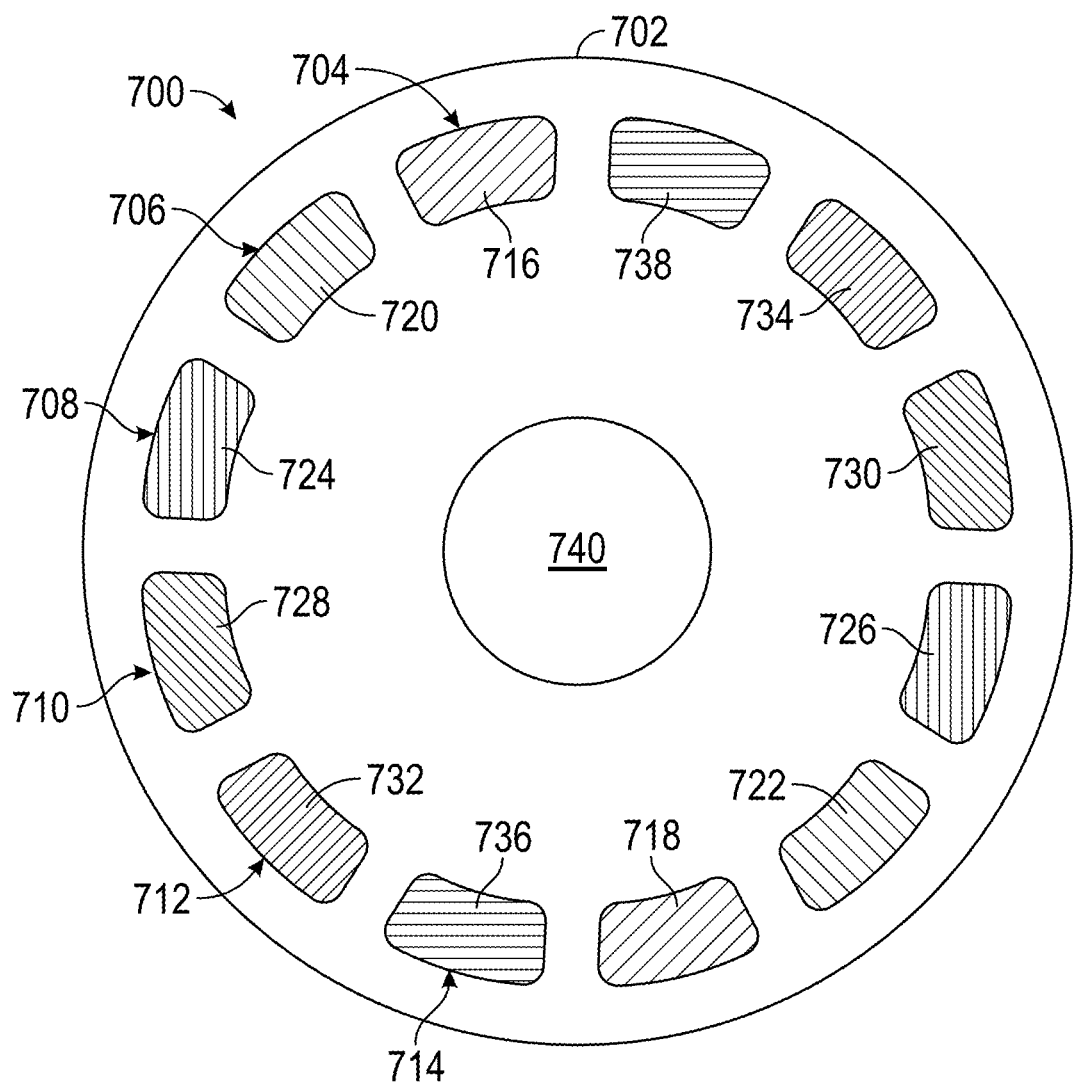
FIG. 7 is an illustration of a top view of a testing device in accordance with an example embodiment.

FIG. 7 is an illustration of yet another testing device in accordance with an example embodiment. Testing device 700 includes base 702 and first plate pair 704, second plate pair 706, third plate pair 708, fourth plate pair 710, fifth plate pair 712, and sixth plate pair 714. Although not shown in this example, testing device 700 may also include a control box similar to control box 106 in FIG. 1, a handle similar to handle 108 in FIG. 1, or both.

First plate pair 704 includes plate 716 and plate 718. Second plate pair 706 includes plate 720 and plate 722. Third plate pair 708 includes plate 724 and plate 726. Fourth plate pair 710 includes plate 728 and plate 730. Fifth plate pair 712 includes plate 732 and plate 734. Sixth plate pair 714 includes plate 736 and plate 738.

First plate pair 704, second plate pair 706, third plate pair 708, fourth plate pair 710, fifth plate pair 712, and sixth plate pair 714 are aligned symmetrically around target area 740. In particular, these six plate pairs have a symmetrical dodecagonal configuration. First plate pair 704 may be used to measure resistance (e.g., effective series resistance) in a 0-degree fiber orientation. Second plate pair 706 may be used to measure resistance in a 30-degree fiber orientation. Third plate pair 708 may be used to measure resistance in a 60-degree fiber orientation. Fourth plate pair 710 may be used to measure resistance in a 90-degree fiber orientation. Fifth plate pair 712 may be used to measure resistance in a −60-degree fiber orientation. Sixth plate pair 714 may be used to measure resistance in a −30-degree fiber orientation.

The illustrations in FIGS. 1-7 are not meant to imply physical or architectural limitations to the manner in which an illustrative embodiment may be implemented. Other components in addition to or in place of the ones illustrated may be used. Some components may be optional.

Figure 8:
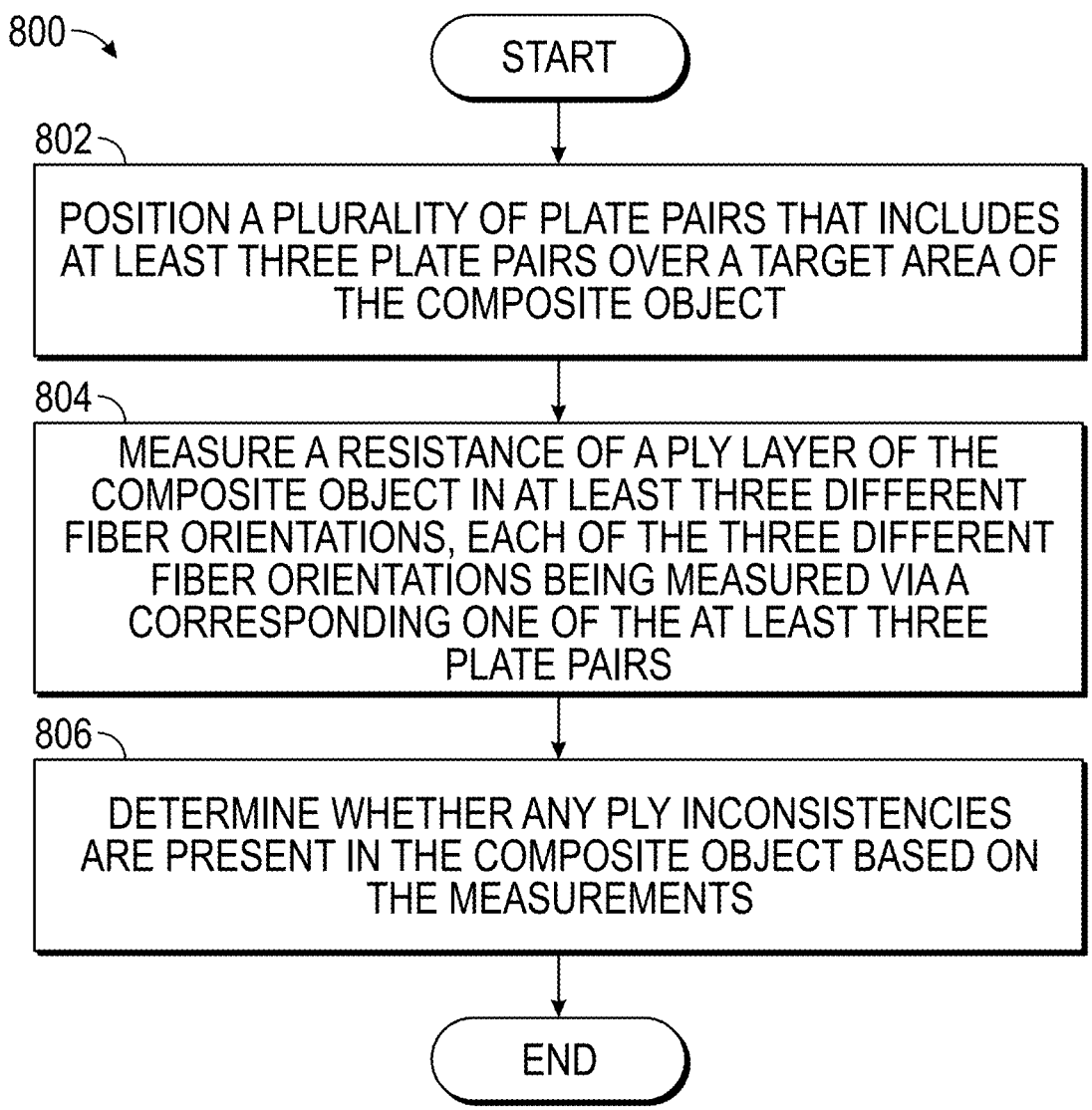
FIG. 8 is a flowchart of a process for testing a composite object in accordance with an example embodiment.

FIG. 8 is a flowchart of a process for testing a composite object in accordance with an example embodiment. Process 800 in FIG. 8 may be used to test a composite object such as composite object 101 in FIGS. 1-2 or composite object 300 in FIG. 3. Further, process 800 may be performed using a testing device such as, for example, testing device 100 described in FIGS. 1-3, testing device 600 in FIG. 6, testing device 700 in FIG. 7, or some other type of similarly implemented testing device.

Process 800 may begin by positioning a plurality of plate pairs that includes at least three plate pairs over a surface of the composite object (operation 802). Each of these plate pairs includes two capacitive plates for use in capacitively coupling with the composite object.

A resistance of a plurality of plies of the composite object in at least three different fiber orientations is measured, each of the at least three different fiber orientations being measured via a corresponding one of the at least three plate pairs (operation 804). The measured resistance may be an effective series resistance. In one or more examples, in operation 804, the resistance for a fiber orientation is measured by measuring a voltage output from a circuit branch that includes the plate pair designed to measure that fiber orientation. Thus, in operation 804, the measurements of resistance may actually be measurements of voltage that indicate resistance.

A determination is then made as to whether any ply inconsistencies are present in the composite object based on the measurements (operation 806), with the process terminating thereafter. Operation 806 may be performed by, for example, processing the measurements using one or more mathematical analysis tools or computer programs.

Figure 9:
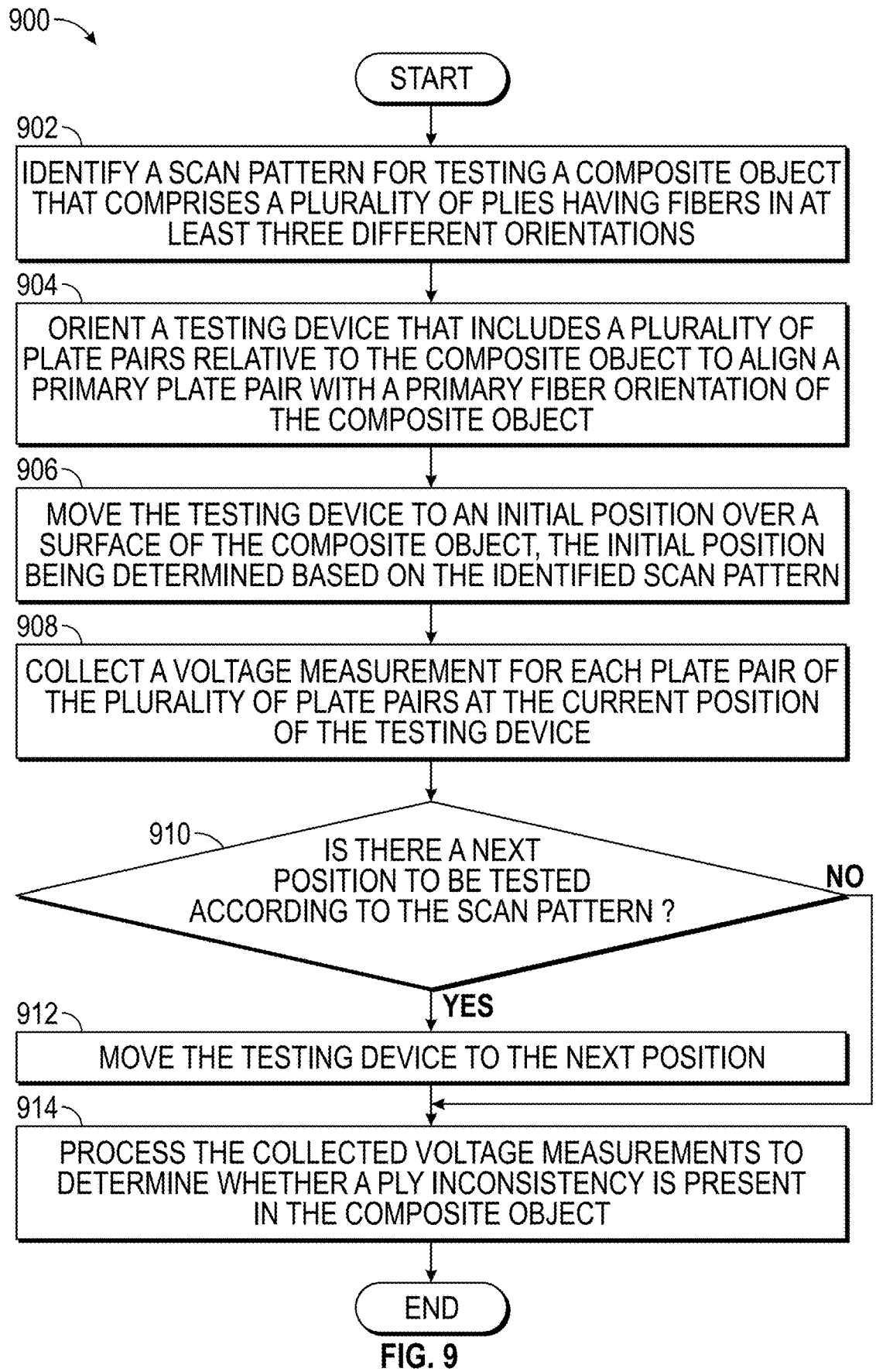
FIG. 9 is a flowchart of a process for testing a composite object in accordance with an example embodiment.

FIG. 9 is a flowchart of a process for testing a composite object in accordance with an example embodiment. Process 900 in FIG. 9 may be used to test a composite object such as composite object 101 in FIGS. 1-2 or composite object 300 in FIG. 3. Further, process 900 may be performed using a testing device such as, for example, testing device 100 described in FIGS. 1-3, testing device 600 in FIG. 6, testing device 700 in FIG. 7, or some other type of similarly implemented testing device.

Process 900 may begin by identifying a scan pattern for testing a composite object that comprises a plurality of plies having fibers in at least three different orientations (operation 902). For example, the composite object may have a first plurality of plies with fibers in a first fiber orientation, a second plurality of plies with fibers in a second fiber orientation, a third plurality of plies with fibers in a third fiber orientation, and a fourth plurality of plies with fibers in a fourth fiber orientation. One of these fiber orientations is a 0-degree fiber orientation, which is considered the primary fiber orientation. In some examples, the scan pattern identified in operation 902 may be a raster pattern.

A testing device that includes a plurality of plate pairs is then oriented relative to the composite object to align a primary plate pair with a primary fiber orientation of the composite object (operation 904). For example, the testing device may include a plate pair for each of the first plurality of plies, the second plurality of plies, the third plurality of plies, and the fourth plurality of plies of the composite object. In one illustrative example, the primary plate pair may be the plate pair designed to align with the primary fiber orientation, which is the 0-degree fiber orientation.

Thereafter, the testing device is moved to an initial position over a surface of the composite object, the initial position being determined based on the identified scan pattern (operation 906). A voltage measurement is collected for each plate pair of the plurality of plate pairs at the current position of the testing device (operation 908). For each plate pair, operation 908 may include generating a voltage output from a measurement branch of a circuit, the measurement branch including at least the plate pair, the composite object (and thereby, the effective series resistance of the plies in the fiber orientation corresponding to the plate pair), and a reference resistor.

In some illustrative examples, operation 908 optionally includes generating a voltage measurement for a reference branch of the circuit, the reference branch including various electronic components that include at least two resistors set to the expected effective series resistance for the composite object. As previously discussed above, the expected effective series resistance is based on the number of plies in the composite object, the thickness of each of the plies (and/or the thickness of the composite object), and the ply density. In other illustrative examples, the voltage measurement generated for a plate pair in operation 908 is a voltage differential that is the difference between a first voltage output from the measurement branch corresponding to the plate pair and a second voltage output from the reference branch.

Thereafter, a determination is made as to whether there is a next position to be tested according to the scan pattern (operation 910). If there is a next position, the testing device is moved to the next position (operation 912). The collected voltage measurements are then processed to determine whether a ply inconsistency is present in the composite object (operation 914), with the process terminating thereafter. With reference again to operation 910, if there is not a next position to be scanned, process 900 proceeds directly to operation 914 described above.

Figure 10:
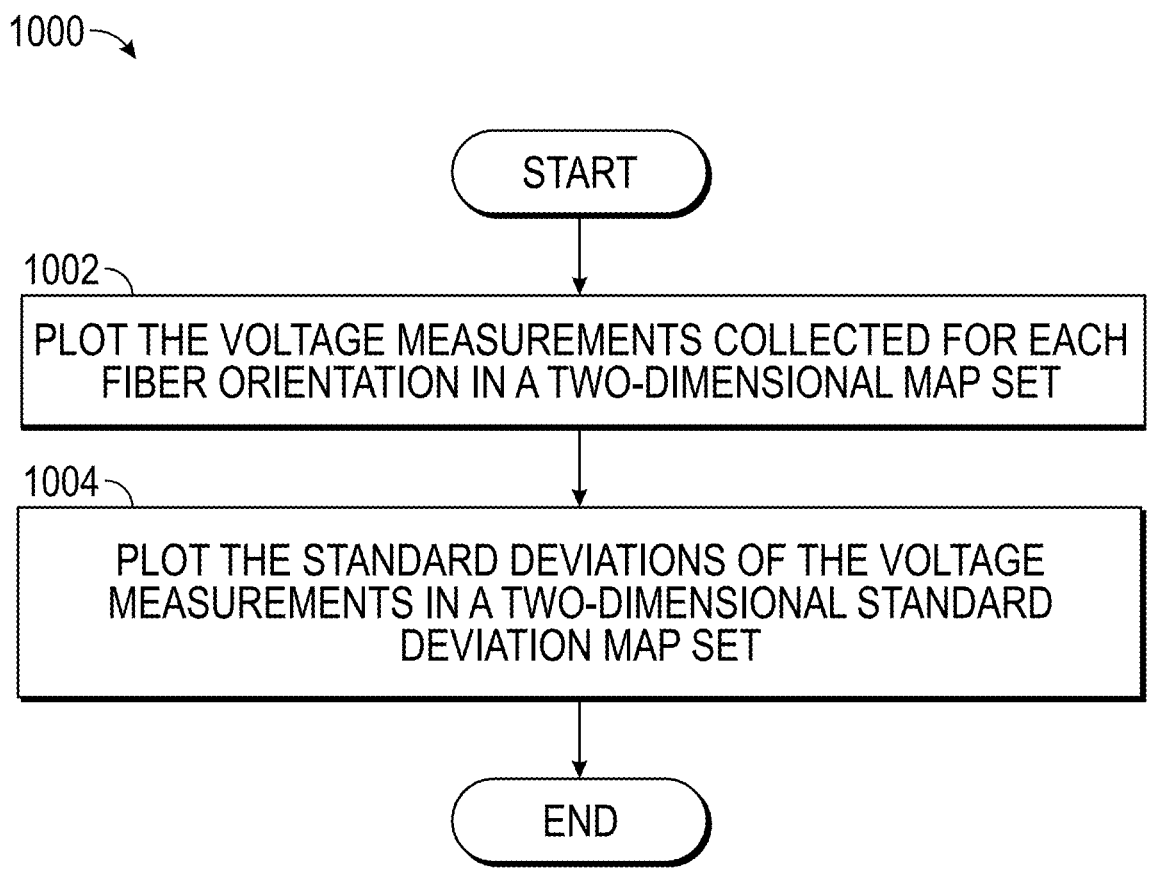
FIG. 10 is a flowchart for processing voltage measurements in accordance with an example embodiment.

FIG. 10 is a flowchart for processing voltage measurements in accordance with an example embodiment. Process 1000 may be an example of one manner in which operation 914 in FIG. 9 may be implemented. Process 1000 may be implemented using, for example, a computer system such as computer system 140 in FIG. 1 or some other type of processor.

Process 1000 may begin by plotting the voltage measurements collected for each fiber orientation in a two-dimensional map set (operation 1002). The two-dimensional map set may include, for example, a two-dimensional map for each of the different fiber orientations. In one or more examples, the two-dimensional map for a given fiber orientation is a contour map that provides a visual indication of whether a ply inconsistency is detected in the plies of that fiber orientation.

In some cases, process 1000 further includes plotting the standard deviations of the voltage measurements in a two-dimensional standard deviation map set (operation 1004), with the process terminating thereafter. The two-dimensional standard deviation map set includes a two-dimensional standard deviation map for each fiber orientation. The two-dimensional standard deviation map for a given fiber orientation provides an indication of how reliable and accurate the detection of a ply inconsistency is.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
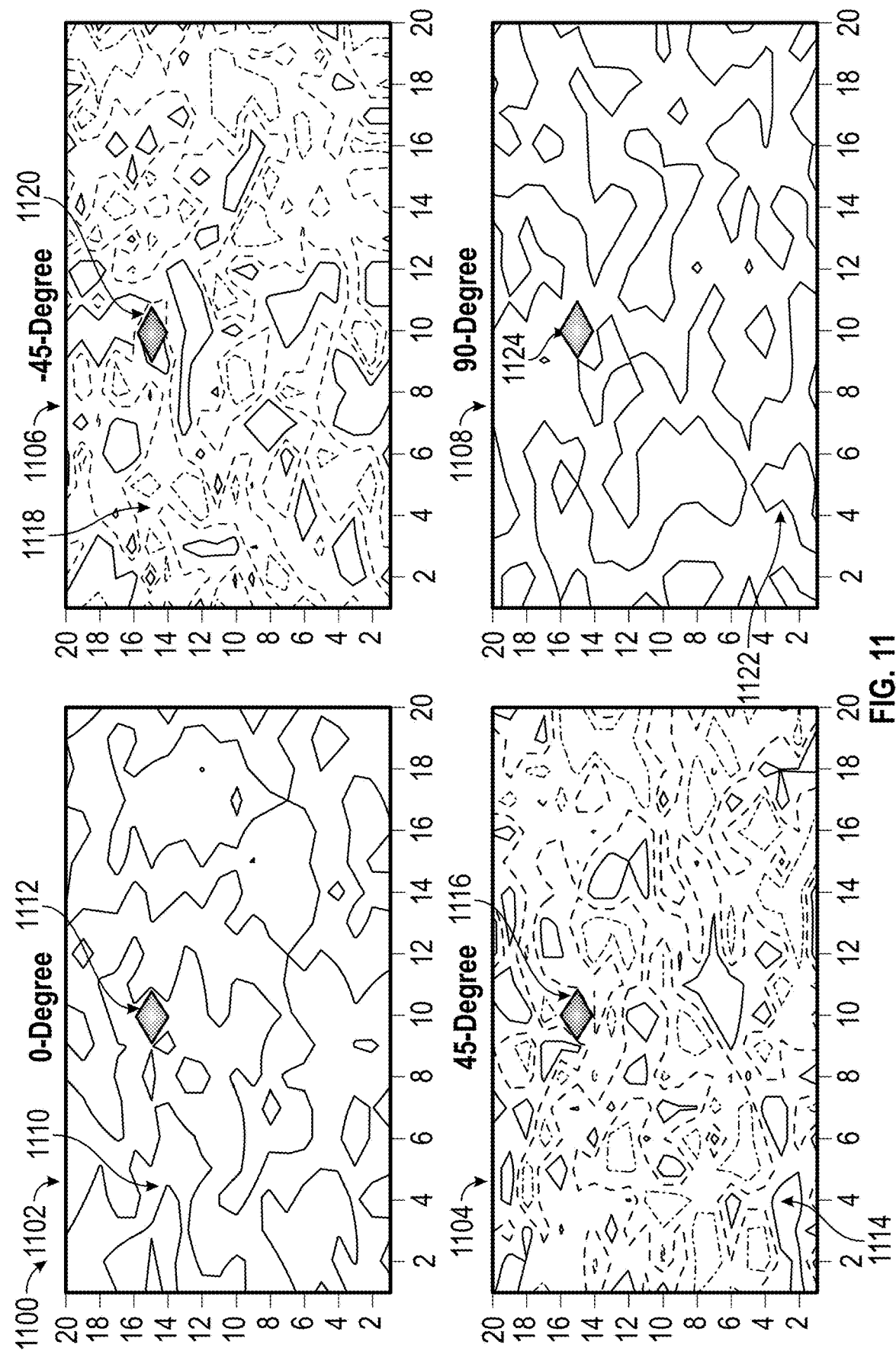
FIG. 11 is an example of a two-dimensional map set in accordance with an example embodiment.

FIG. 11 is an example of a two-dimensional map set in accordance with an example embodiment. Two-dimensional map set 1100 is an example of one implementation for the two-dimensional map set generated in operation 1002 in FIG. 10.

Two-dimensional map set 1100 includes map 1102, map 1104, map 1106, and map 1108, each of which is a two-dimensional map for a different fiber orientation for a composite object. In particular, each of these maps is a contour plot of the voltage measurements collected with respect to a composite object. These voltage measurements are voltage differentials. Further, each of these maps has a M-N coordinate system that matches the coordinate system for the surface of the composite object.

Map 1102 is a two-dimensional map for the plies of a composite object having fibers in the 0-degree fiber orientation. Map 1102 includes plot 1110 of voltage measurements. In this illustrative example, a ply inconsistency is visually indicated (or detected) at location 1112. Map 1104 is a two-dimensional map for the plies of a composite object having fibers in the 45-degree fiber orientation. Map 1104 includes plot 1114 of voltage measurements. In this illustrative example, a ply inconsistency is visually indicated (or detected) at location 1116.

Map 1106 is a two-dimensional map for the plies of a composite object having fibers in the −45-degree fiber orientation. Map 1106 includes plot 1118 of voltage measurements. In this example, a ply inconsistency is visually indicated (or detected) at location 1120. Map 1108 is a two-dimensional map for the plies of a composite object having fibers in the 90-degree fiber orientation. Map 1108 includes plot 1122 of voltage measurements. In this example, a ply inconsistency is visually indicated (or detected) at location 1124.

Plots 1110, 1114, 1118, and 1122 are shown in FIG. 11 with patterned lines. Each of the different patterned lines in plots 1110, 1114, 1118, and 1122 represents a different voltage measurement value. For example, voltage measurements within a certain range of a particular value may be plotted using one pattern, while voltage measurements within a certain range of a different value may be plotted using another pattern. In other illustrative examples, plots 1110, 1114, 1118, and 1122 may use different colors instead of different line patterns.

Figure 12:
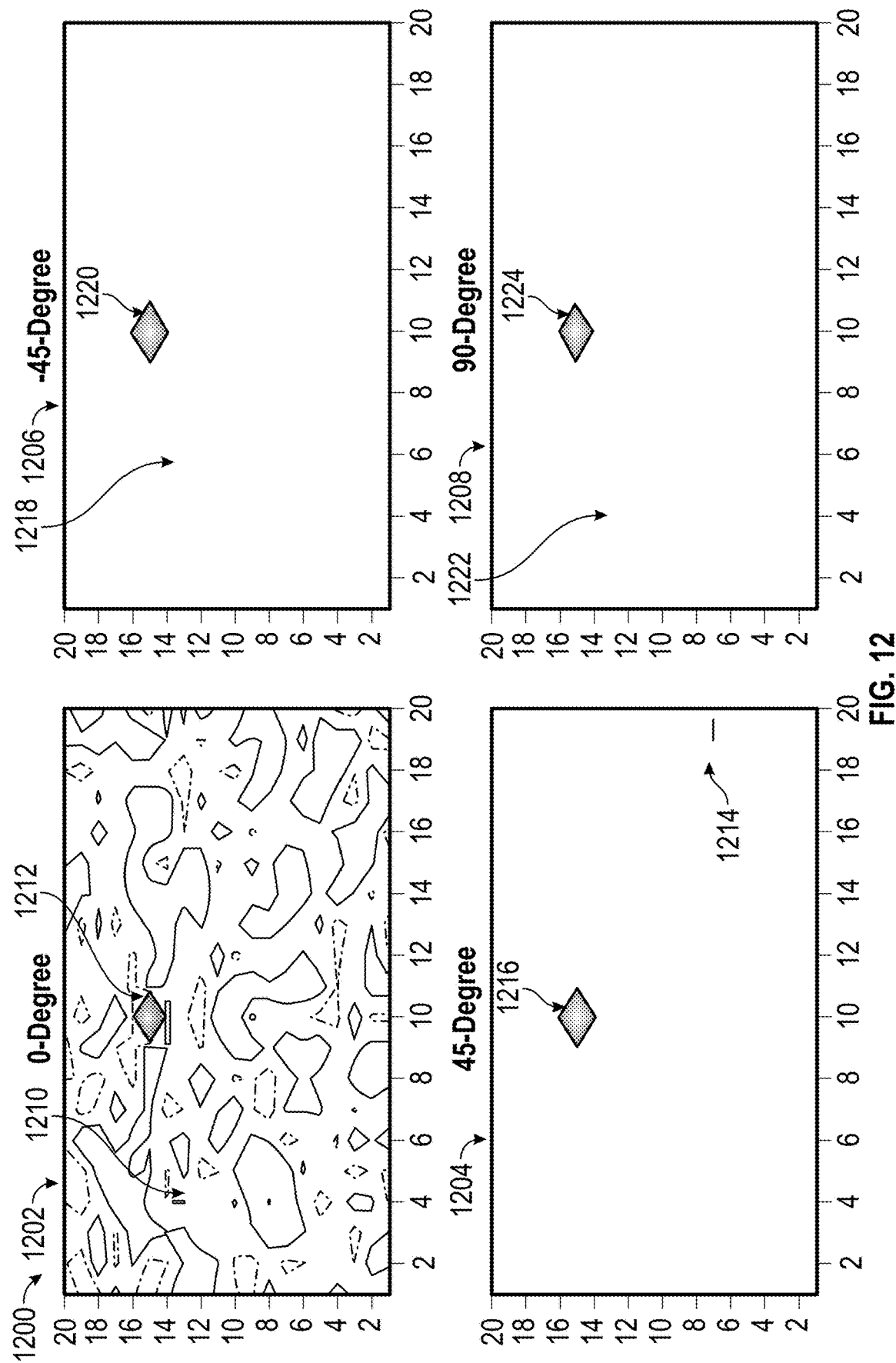
FIG. 12 is an example of a two-dimensional standard deviation map set in accordance with an example embodiment.

FIG. 12 is an example of a two-dimensional standard deviation map set in accordance with an example embodiment. Two-dimensional standard deviation map set 1200 is an example of one implementation for the two-dimensional standard deviation map set generated in operation 1004 in FIG. 10.

Two-dimensional standard deviation map set 1200 is generated by taking the standard deviations of the voltage measurement data provided in two-dimensional map set 1200 in FIG. 12. Two-dimensional standard deviation map set 1200 includes map 1202, 1204, 1206, and 1208. Each of these maps is a two-dimensional standard deviation map. In particular, each of these maps is a contour plot of standard deviations.

Map 1202 includes plot 1210, which is a contour plot for the standard deviations of the voltage measurements of map 1202 in FIG. 12. Plot 1210 indicates that in addition to the detection of the ply inconsistency at location 1212, there is some noise in the voltage measurement data for the 0-degree fiber orientation. Map 1204 includes plot 1214, which is a contour plot for the standard deviations of the voltage measurements of map 1204 in FIG. 12. Plot 1214 indicates that outside of the detection of the ply inconsistency at location 1214, there is minimal noise in the voltage measurement data for the 45-degree orientation.

Map 1206 includes plot 1218, which is a contour plot for the standard deviations of the voltage measurements of map 1206 in FIG. 12. Plot 1218 indicates that outside of the detection of the ply inconsistency at location 1220, there is minimal noise in the voltage measurement data for the −45-degree orientation. Map 1208 includes plot 1222, which is a contour plot for the standard deviations of the voltage measurements of map 1208 in FIG. 12. Plot 1220 indicates that outside of the detection of the ply inconsistency at location 1224, there is minimal noise in the voltage measurement data for the 90-degree orientation.

Thus, the different example embodiments described above provide systems and methods for noninvasively testing a composite object to easily, quickly, and efficiently detect ply inconsistencies, such as fiber discontinuity. For example, testing device 100 described in FIGS. 1-3 may be used to test composite objects for fiber discontinuity during manufacturing and repair to ensure that these composite objects have the desired mechanical strength and desired electrical conductivity.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of plate pairs that includes at least three plate pairs, each plate pair comprising two capacitive plates aligned to measure a resistance of plies of a composite object in a corresponding fiber orientation; and
a base to which the plurality of plate pairs is attached;
wherein each plate pair of the plurality of plate pairs forms at least part of a measurement branch in a circuit for a corresponding fiber orientation, the measurement branch being configured to generate a first voltage output;
wherein the circuit further comprises a reference branch comprising at least one reference resistor that represents an expected effective series resistance, the reference branch being configured to generate a second voltage output; and
wherein a voltage differential based on the first voltage output and the second voltage output indicates a difference between an effective series resistance for fibers in the corresponding fiber orientation and the expected effective series resistance for the fibers in the corresponding fiber orientation.

2. The apparatus of claim 1, wherein the plurality of plate pairs comprises:
   a first plate pair for measuring the resistance in a 0-degree fiber orientation;
   a second plate pair for measuring the resistance in a 45-degree fiber orientation relative to the 0-degree fiber orientation;
   a third plate pair for measuring the resistance in a 90-degree fiber orientation relative to the 0-degree fiber orientation; and
   a fourth plate pair for measuring the resistance in a −45-degree fiber orientation relative to the 0-degree fiber orientation.

3. The apparatus of claim 1, wherein the plurality of plate pairs comprises:
   a first plate pair for measuring the resistance in a 0-degree fiber orientation;
   a second plate pair for measuring the resistance in a 60-degree fiber orientation relative to the 0-degree fiber orientation; and
   a third plate pair for measuring the resistance in a −60-degree fiber orientation relative to the 0-degree fiber orientation.

4. The apparatus of claim 1, wherein the plurality of plate pairs comprises:
   a first plate pair for measuring the resistance in a 0-degree fiber orientation;
   a second plate pair for measuring the resistance in a 30-degree fiber orientation relative to the 0-degree fiber orientation;
   a third plate pair for measuring the resistance in a 60-degree fiber orientation relative to the 0-degree fiber orientation;
   a fourth plate pair for measuring the resistance in a 90-degree fiber orientation relative to the 0-degree fiber orientation;
   a fifth plate pair for measuring the resistance in a −60-degree fiber orientation relative to the 0-degree fiber orientation; and
   a sixth plate pair for measuring the resistance in a −30-degree fiber orientation relative to the 0-degree fiber orientation.

5. The apparatus of claim 1, wherein the plurality of plate pairs is arranged in a symmetrical octagonal configuration that defines a testing area centrally located with respect to the plurality of plate pairs.

6. The apparatus of claim 1, wherein the two capacitive plates of each of the plurality of plate pairs are separated by a same distance.

7. The apparatus of claim 1, wherein the measurement branches and the reference branch are connected in parallel with each other.

8. The apparatus of claim 7, wherein the measurement branches and the reference branch are connected in parallel with each other and an AC voltage source.

9. The apparatus of claim 1, wherein the base is a printed circuit board.

10. The apparatus of claim 9, wherein the base and the plurality of plate pairs form a testing device that further comprises:
   a housing attached to the base, wherein the housing holds circuitry connected to the printed circuit board.

11. The apparatus of claim 10, wherein the testing device further comprises:
   a handle attached to the housing, wherein the handle allows an operator to move the testing device along a surface of a composite object.

12. The apparatus of claim 1, wherein a capacitive plate of the two capacitive plates comprises:
   a metal layer.

13. The apparatus of claim 12, wherein the capacitive plate further comprises:
   an insulating layer.

14. A method for testing a composite object, the method comprising:
   positioning a plurality of plate pairs that includes at least three plate pairs over a surface of the composite object; and
   measuring a resistance of a plurality of plies in the composite object in at least three different fiber orientations, each of the at least three different fiber orientations being measured via a corresponding one of the at least three plate pairs;
   wherein each plate pair of the plurality of plate pairs forms at least part of a measurement branch in a circuit for a corresponding fiber orientation, the measurement branch being configured to generate a first voltage output;
   wherein the circuit further comprises a reference branch comprising at least one reference resistor that represents an expected effective series resistance, the reference branch being configured to generate a second voltage output; and
   wherein a voltage differential based on the first voltage output and the second voltage output indicates a difference between an effective series resistance for fibers in the corresponding fiber orientation and the expected effective series resistance for the fibers in the corresponding fiber orientation.

15. The method of claim 14, wherein measuring the resistance comprises:
   measuring the resistance in a 0-degree fiber orientation by a first plate pair in the plurality of plate pairs;
   measuring the resistance in a 45-degree fiber orientation relative to the 0-degree fiber orientation by a second plate pair in the plurality of plate pairs;
   measuring the resistance in a −45-degree fiber orientation relative to the 0-degree fiber orientation by a third plate pair in the plurality of plate pairs; and
   measuring the resistance in a 90-degree fiber orientation relative to the 0-degree fiber orientation by a fourth plate pair in the plurality of plate pairs.

16. The method of claim 14, wherein measuring the resistance comprises:
   measuring the resistance in a 0-degree fiber orientation by a first plate pair in the plurality of plate pairs;
   measuring the resistance in a 60-degree fiber orientation relative to the 0-degree fiber orientation by a second plate pair in the plurality of plate pairs; and
   measuring the resistance in a −60-degree fiber orientation relative to the 0-degree fiber orientation by a third plate pair in the plurality of plate pairs.

17. The method of claim 14, wherein measuring the resistance comprises:
   measuring the resistance in a 0-degree fiber orientation by a first plate pair in the plurality of plate pairs;
   measuring the resistance in a 30-degree fiber orientation relative to the 0-degree fiber orientation by a second plate pair in the plurality of plate pairs;

measuring the resistance in a −30-degree fiber orientation relative to the 0-degree fiber orientation by a third plate pair in the plurality of plate pairs;

measuring the resistance in a 60-degree fiber orientation relative to the 0-degree fiber orientation by a fourth plate pair in the plurality of plate pairs;

measuring the resistance in a −60-degree fiber orientation relative to the 0-degree fiber orientation by a fifth plate pair in the plurality of plate pairs; and measuring the resistance in a 90-degree fiber orientation relative to the 0-degree fiber orientation by a sixth plate pair in the plurality of plate pairs.

18. The method of claim 17, further comprising:

moving a testing device that includes the plurality of plate pairs along the surface of the composite object in a raster pattern.

19. The method of claim 14, wherein measuring the resistance comprises:

generating a voltage measurement for each of the at least three plate pairs at each of a plurality of positions along the surface of the composite object.

20. A testing device comprising:

a base;

a plurality of plate pairs attached to the base,
wherein each plate pair includes two capacitive plates aligned to measure a resistance of plies in a composite object for a different fiber orientation;

wherein an area between the plurality of plate pairs defines a target area; and wherein, when the plurality of plate pairs is positioned over a surface of the composite object,
voltage measurements generated at each of a plurality of different positions over the surface provide an indication of whether a fiber discontinuity is present in the composite object;

each plate pair of the plurality of plate pairs forms at least part of a measurement branch in a circuit for a corresponding fiber orientation, the measurement branch being configured to generate a first voltage output;

the circuit further comprises a reference branch comprising at least one reference resistor that represents an expected effective series resistance, the reference branch being configured to generate a second voltage output; and a voltage differential based on the first voltage output and the second voltage output indicates a difference between an effective series resistance for fibers in the corresponding fiber orientation and the expected effective series resistance for the fibers in the corresponding fiber orientation.

* * * * *